United States Patent Office 3,133,907
Patented May 19, 1964

3,133,907
PREPARATION OF POLYMERS FROM 3-ETHYLIDENE-1-CYCLOHEXENE
Sterling E. Voltz, William P. Griffin, Jr., and Archibald P. Stuart, Media, Pa., assignors to Sun Oil Company, Philadelphia, Pa., a corporation of New Jersey
No Drawing. Filed Aug. 18, 1960, Ser. No. 50,335
6 Claims. (Cl. 260—93.1)

This invention relates to a method of preparing solid polymers of 3-ethylidene-1-cyclohexene and to the novel polymers so produced.

In our copending application Serial No. 33,080, filed June 1, 1960 now Patent No. 3,080,432, a method is disclosed and claimed for preparing from 4-vinyl-1-cyclohexene and conjugated diolefin product which is mainly 3-ethylidene-1-cyclohexene. In one embodiment this method involves contacting 4-vinyl-1-cyclohexene at about 0° C. with a catalyst consisting of sodium on high surface alumina wherein the sodium content of the catalyst is about 1% by weight. The 4-vinyl-1-cyclohexene charge material can be obtained by dimerization of butadiene in a Diels-Alder type of reaction.

We have found that 3-ethylidene-1-cyclohexene can be polymerized by means of certain catalyst combinations to yield solid polymers. The polymerization occurs solely through the double bond in the cyclohexene ring and the double bond of the ethylidene group remains unchanged. Hence the product contains cyclohexane rings joined to each other with each ring having an ethylidene group as substituent. The structure of the polymer can be represented as follows (hydrogen atoms being omitted):

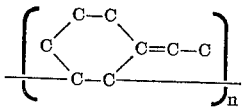

wherein $n$ represents the number of monomer units in the polymer. The presence of the ethylidene groups permits the polymer to be vulcanized.

According to the invention, solid polymers of 3-ethylidene-1-cyclohexene are prepared by contacting this monomer with a catalyst system formed by the addition of an alkyl aluminum compound and a group IV$b$ or group V$b$ metal compound to an inert reaction medium. The aluminum compound is one which has either the formula $R_3Al$ or the formula $R_mAlX_n$ wherein R is an alkyl group of 1–12 carbon atoms, X is either chlorine or bromine, $m$ and $n$ are values not greater than two and the sum of $m$ and $n$ are three. Group IV$b$ metal compounds that can be used include halides of titanium, zirconium and hafnium in which the metal has a valence of at least three and the halogen is chlorine, bromine or iodine. Suitable group V$b$ metal compounds are the halides and oxyhalides of vanadium and niobium in which the halogen is chlorine, bromine or iodine and the metal has a valence of at least three. Examples of specific metal compounds that can be employed are $TiBr_3$, $TiCl_4$, $ZrCl_3$, $ZrI_4$, $HfCl_4$, $VCl_4$, $VI_4$, $VOCl_3$, $NbCl_5$, $NbOCl_3$ and $NbOBr_3$.

Examples of suitable aluminum compounds which are trialkyls are trimethyl aluminum, triethyl aluminum, triiso butyl aluminum, trihexyl aluminum, trinonyl aluminum and tridodecyl aluminum. Examples of suitable alkyl aluminum halides are methyl aluminum diiodide, ethyl aluminum dichloride, diethyl aluminum bromide, ethyl aluminum sesquichloride, propyl aluminum dibromide, dibutyl aluminum iodide, isobutyl aluminum sesquibromide, dihexyl aluminum chloride, decyl aluminum dibromide, etc. The preferred catalyst components are $TiCl_4$ and triethyl aluminum. The molar ratio of the aluminum compound to the titanium compound can vary considerably, for example, within the range of 0.2 to 10, but it is generally preferable to employ at least an equal molar amount of the aluminum compound. The molar proportion of titanium compound to monomer reactant generally should be in the range of 0.001–0.01.

The reaction preferably is conducted in an inert hydrocarbon reaction medium such as pentane, heptane, octane, decane, benzene, toluene, xylene or the like, although the ethylidene monomer can be polymerized in the absence of any solvent. The temperature for carrying out the polymerization lies in the range of 0–150° C. and more preferably 20–100° C. After the reaction has taken place, the catalyst can be deactivated by the addition of an alcohol and the polymer cen be worked up in conventional manner.

The following examples illustrate the invention more specifically:

Example I

In a small reactor provided with a magnetic stirrer, a catalyst system was prepared by admixing 100 ml. of n-hexane, 3.1 ml. of a 1.0 molar solution of triethyl aluminum in n-hexane and 3.0 ml. of a 1.0 molar solution of $TiCl_4$ in n-hexane. 10 ml. of 3-ethylidene-1-cyclohexene was added to the reactor and the mixture was stirred at 25° C. for 16 hrs. Thereafter the temperature was raised to 60° C. and the mixture was stirred for an additional 2 hrs. A stiff, white solid polymer was obtained in a yield of essentially 100% by weight based on the starting monomer. The polymer melted in the range of 90–100° C. X-ray diffraction showed that the polymer was essentially noncrystalline. By infrared spectra it was found that the polymer was composed of cyclohexane rings having ethylidene groups attached thereto. More specifically, the infrared spectra showed a single —$CH_2$— absorption band at 1450 cm.$^{-1}$ which indicates cyclohexane rings, bands at 1665 and 1710 cm.$^{-1}$ which indicate ethylidene groups and a band at 1370 cm.$^{-1}$ which corresponds to methyl groups. This shows that the polymerization took place through the double bond in the cyclohexene ring rather than via the ethylidene double bond.

Example II

Another reaction was carried out in similar manner but using $TiCl_3$ as one of the catalyst components. The reaction mixture was composed of 100 ml. n-heptane, 4.0 ml. of a 1.0 molar solution of triethyl aluminum in n-hexane, 2 ml. of a 1.0 molar solution of $TiCl_3$ in n-hexane and 10 ml. of the 3-ethylidene-1-cyclohexene. Reaction times were 48 hrs. at 25° C. and 4 hrs. at 60° C. In this case the polymer yield was about 60% by weight of the conjugated starting monomer. The polymer had essentially the same characteristics as that obtained in the first example.

By way of comparison, when an attempt to polymerize 4-vinyl-1-cyclohexene was made under conditions similar to those employed in Example I, only a very small amount of solid polymer was formed and the polymer in this case was a white powder having some crystallinity rather than a stiff noncrystalline solid. This shows that the 3-ethylidene-1-cyclohexene is a considerably more active monomer and gives a distinctly different polymerizaiton product than does the somewhat structurally related 4-vinyl-1-cyclohexene.

Other catalyst combinations conforming to the definition hereinabove specified give results generally similar to the foregoing in the polymerization of 3-ethylidene-1-cyclohexene.

This application is a continuation-in-part of our copending application Serial No. 33,080, filed June 1, 1960.

We claim:
1. Method of forming a solid homopolymer having cyclohexane rings attached to each other and an ethyli- dene group attached to each ring which comprises contacting 3-ethylidene-1-cyclohexene at a temperature in the range of 0–150° C. with a catalyst system comprising a mixture of a metal compound selected from the group consisting of halides of titanium, zirconium, hafnium, vanadium and niobium and oxyhalides of vanadium and niobium in which metal compounds the metal has a valence of at least three and the halogen is selected from the group consisting of chlorine, bromine and iodine and an aluminum compound having a formula selected from the group consisting of $R_3Al$ and $R_mAlX_n$ wherein R is an alkyl group of 1–12 carbon atoms, X is selected from the group consisting of chlorine and bromine, $m$ and $n$ are values less than three with the sum of $m$ and $n$ being three, and recovering solid non-crystalline polymer from the reaction mixture.

2. Method according to claim 1 wherein said metal compound is $TiCl_4$.

3. Method according to claim 2 wherein the aluminum compound is aluminum triethyl.

4. Method according to claim 3 wherein the temperature is in the range of 20–100° C.

5. Method according to claim 1 wherein the aluminum compound is aluminum triethyl.

6. A solid non-crystalline homopolymer of 3-ethylidene-1-cyclohexene consisting of cyclohexane rings attached to each other and having an ethylidene group attached to each ring.

References Cited in the file of this patent

UNITED STATES PATENTS

| | | |
|---|---|---|
| 2,842,744 | Pratt | July 8, 1958 |
| 2,995,543 | Williams | Aug. 8, 1961 |
| 3,049,529 | Wicklatz et al. | Aug. 14, 1962 |

OTHER REFERENCES

Slobodin: Chemical Abstracts, volume 30, page 4828 (1936).